(12) United States Patent
Wang et al.

(10) Patent No.: US 9,413,865 B2
(45) Date of Patent: Aug. 9, 2016

(54) HANDHELD ELECTRONIC DEVICE

(75) Inventors: Yi-Shen Wang, Taoyuan County (TW); Hsiao-Chuan Huang, Taoyuan County (TW); Yi-Bin Ho, Taoyuan County (TW); Meng-Sheng Chiang, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 832 days.

(21) Appl. No.: 13/241,228

(22) Filed: Sep. 23, 2011

(65) Prior Publication Data
US 2012/0280913 A1 Nov. 8, 2012

(30) Foreign Application Priority Data

May 5, 2011 (TW) .............................. 100115759 A (51) Int. Cl.
| | |
|---|---|
| *G06F 5/00* | (2006.01) |
| *H04M 1/23* | (2006.01) |
| *G06F 1/16* | (2006.01) |
| *G06F 3/02* | (2006.01) |
| *H04M 1/02* | (2006.01) |

(52) U.S. Cl.
CPC .............. *H04M 1/23* (2013.01); *G06F 1/1662* (2013.01); *G06F 3/0219* (2013.01); *H04M 1/0214* (2013.01)

(58) Field of Classification Search
CPC ... G06F 3/0216; G06F 1/1662; H04M 1/0214
USPC .................................................. 345/169–172
See application file for complete search history.

(56) References Cited

U.S. PATENT DOCUMENTS

| | | | | |
|---|---|---|---|---|
| 5,873,454 | A  * | 2/1999 | Nakamura | 200/514 |
| 7,056,043 | B2 | 6/2006 | Pletikosa | |
| 2002/0098465 | A1* | 7/2002 | Sladden | 434/227 |
| 2006/0017697 | A1 | 1/2006 | Rak et al. | |
| 2006/0062626 | A1 | 3/2006 | Hamilton et al. | |
| 2008/0048976 | A1 | 2/2008 | Rak | |

(Continued)

FOREIGN PATENT DOCUMENTS

| | | |
|---|---|---|
| CN | 2497359 | 6/2002 |
| CN | 2859781 | 1/2007 |

(Continued)

OTHER PUBLICATIONS

"Extended Search Report of Europe Counterpart Application", issued on Aug. 2, 2012, p. 1-p. 6.

(Continued)

*Primary Examiner* — William Boddie
*Assistant Examiner* — Leonid Shapiro
(74) *Attorney, Agent, or Firm* — Jianq Chyun IP Office (57) ABSTRACT

A handheld electronic device is provided, which includes a body and a key layout. The body has a base surface. The key layout is disposed on the base surface of the body and includes a plurality of keys. The key layout is a QWERTY key layout and the keys are adapted for users to press with their left or right thumb while holding the body in single hand or both hands. Each key has a curved surface protruded from the base surface and each curved surface has an inflection point. A distance between two inflection points of the curved surfaces of any two adjacent keys is greater than a distance between two figure centers of the orthogonal projections on the base surface of the curved surfaces of the two adjacent keys.

12 Claims, 6 Drawing Sheets

(56) References Cited

U.S. PATENT DOCUMENTS

| | | |
|---|---|---|
| 2008/0074395 A1 | 3/2008 | Rak |
| 2008/0119247 A1 | 5/2008 | Kuroda |
| 2008/0283378 A1 | 11/2008 | Yurochko et al. |
| 2008/0293459 A1* | 11/2008 | Wang .......................... 455/575.3 |

FOREIGN PATENT DOCUMENTS

| | | |
|---|---|---|
| CN | 101272411 | 9/2008 |
| CN | 201194420 | 2/2009 |
| CN | 101925269 | 12/2010 |
| WO | 2006-130747 | 12/2006 |
| WO | WO 2006/130747 A2 * | 12/2006 |
| WO | 2011004878 | 1/2011 |

OTHER PUBLICATIONS

"Office Action of Taiwan Counterpart Application", issued on Jul. 15, 2013, p. 1-p. 9.

"Office Action of China Counterpart Application", issued on Feb. 13, 2014, p. 1-p. 10.

* cited by examiner

HANDHELD ELECTRONIC DEVICE

CROSS-REFERENCE TO RELATED APPLICATION

This application claims the priority benefit of Taiwan application serial no. 100115759, filed on May 5, 2011. The entirety of the above-mentioned patent application is hereby incorporated by reference herein and made a part of this specification.

BACKGROUND OF THE INVENTION

1. Field of the Invention

The disclosure generally relates to a handheld electronic device, and more particularly, to a handheld electronic device with a QWERTY keyboard.

2. Description of Related Art

A handheld electronic device is referred to an electronic device allowing a user to hold and manipulate it with hands, such as mobile phone, multimedia player, PDA (personal digital assistant), pocket computer, pocket game machine and handheld GPS (global positioning system). Such sort of electronic devices usually is smaller and lighter to facilitate carrying it with the user. Some sorts of handheld electronic devices (for example, mobile phone) are further equipped with a QWERTY keyboard to increase the rate of inputting data. However, limited by a smaller shape dimension, the keys of a QWERTY keyboard disposed at a handheld electronic device are often laid out with high density and have a smaller area, and hence the probability of wrongly touching a key by a user is increased. Wrongly touching a key means a finger of the user simultaneously presses two or more keys.

SUMMARY OF THE INVENTION

Accordingly, the disclosure is directed to a handheld electronic device for increasing the correctness rate of inputting data.

An embodiment of the disclosure provides a handheld electronic device, which includes a body and a key layout. The body has a base surface. The key layout is disposed on the base surface of the body and includes a plurality of keys. The key layout is a QWERTY key layout and the keys are adapted for users to press with their left or right thumb while holding the body in single hand or both hands. Each key has a curved surface protruded from the base surface and each curved surface has an inflection point. A distance between two inflection points of the curved surfaces of any two adjacent keys is greater than a distance between two figure centres of the orthogonal projections on the base surface of the curved surfaces of the two adjacent keys.

Based on the above depiction, in the disclosure, the distance between two inflection points of the curved surfaces of any two adjacent keys is greater than the distance between two figure centres of the orthogonal projections on the base surface of the curved surfaces. In this way, different keys have different profile shapes on the base surface, so that a user during pressing the keys can identify by touch perception the position difference of each key to reduce the probability of wrongly touching a key and thereby increase the correctness rate of inputting data.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1A:
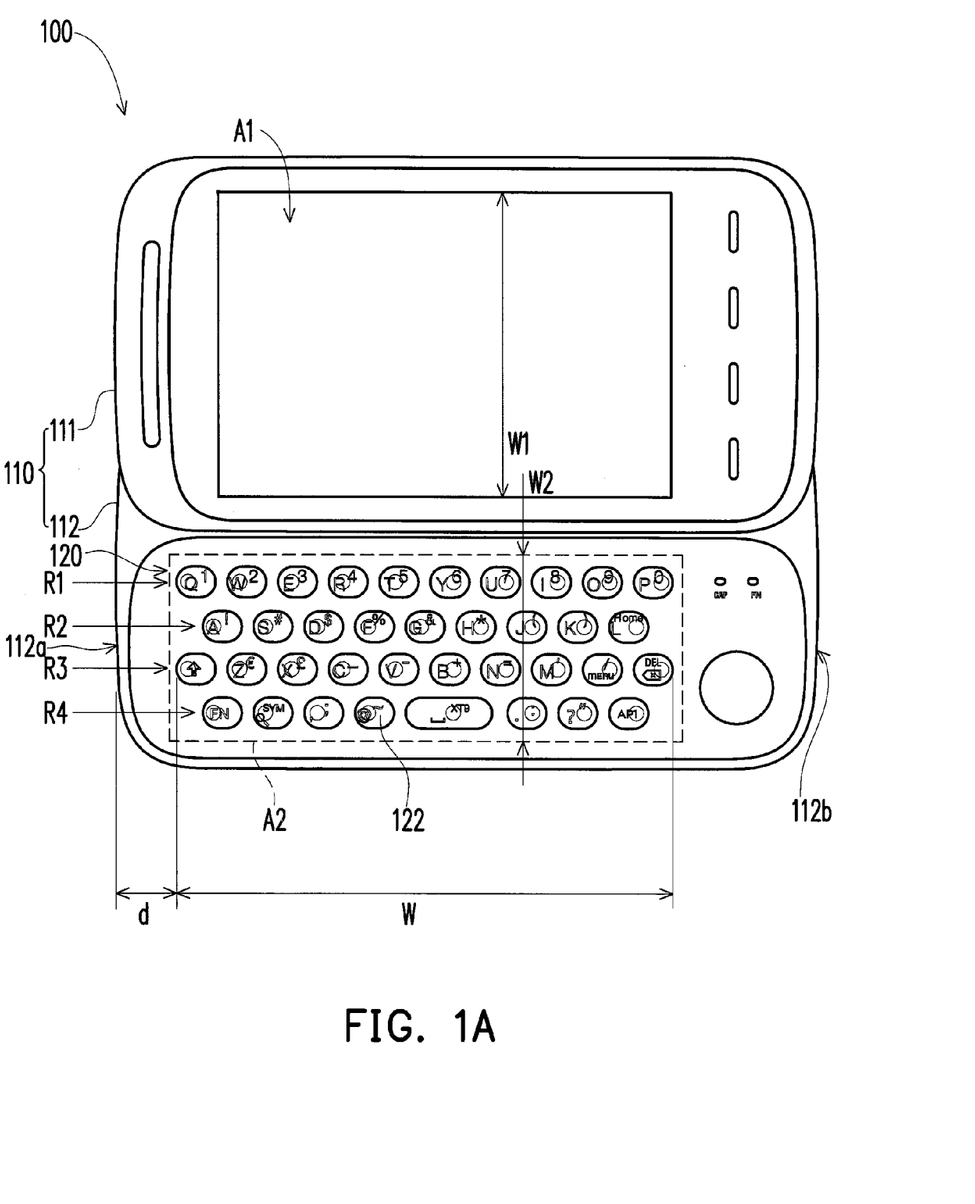
FIG. 1A is a schematic diagram of a handheld electronic device according to an embodiment of the disclosure.
Figure 1B:
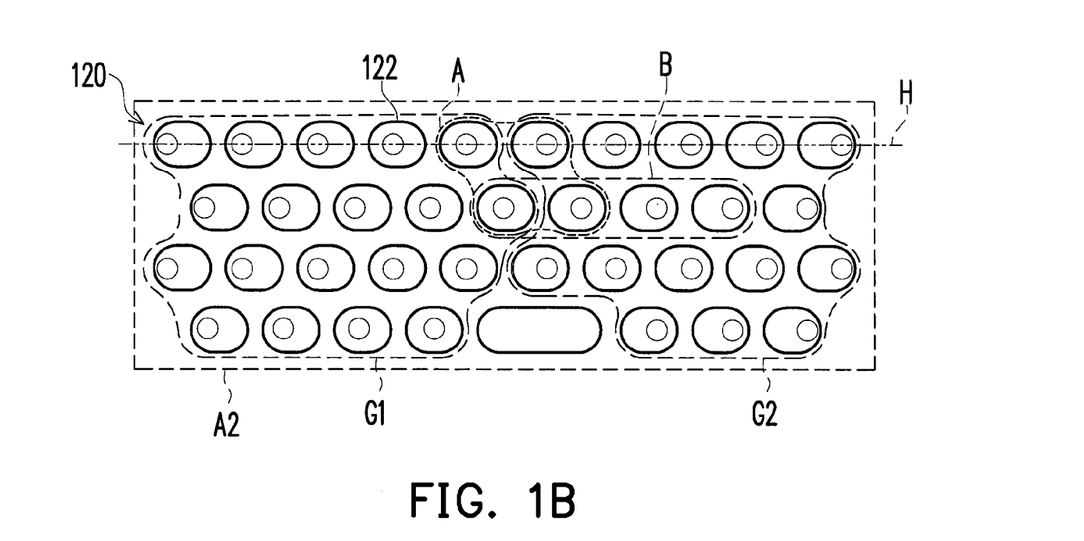
FIG. 1B is a local schematic diagram of the handheld electronic device of FIG. 1A.
Figure 1C:
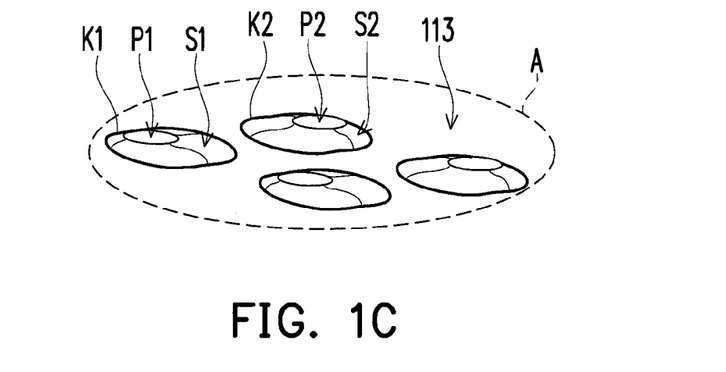
FIG. 1C is a local schematic diagram of the handheld electronic device of FIG. 1B.

FIG. 1A is a schematic diagram of a handheld electronic device according to an embodiment of the disclosure, FIG. 1B is a local schematic diagram of the handheld electronic device of FIG. 1A and FIG. 1C is a local schematic diagram of the handheld electronic device of FIG. 1B, in which the key layout in FIG. 1B is shown with a top-view angle and an A portion of the key layout of FIG. 1B is shown in FIG. 1C with a 3-dimensional view angle. Referring to FIGS. 1A, 1B and 1C, in the embodiment, the handheld electronic device 100 includes a body 110 and a key layout 120. The body 110 includes a first sub body 111 and a second sub body 112, in which the first sub body 111 may be movably connected to the second sub body 112 so as to be unfolded or closed to the second sub body 112.

The first sub body 111 has a display region A1 and the second sub body 112 has a key region A2. The key layout 120 is located on a base surface 113 in the key region A2, and when the second sub body 112 is unfolded relatively to the first sub body 111, the key region A2 is adjacent to the display region A1. In other words, the handheld electronic device 100 of the embodiment is the one in slide-type design. The key layout 120 of the embodiment is a QWERTY key layout including a plurality of keys 122. The keys 122 herein are adapted for users to press with their left or right thumb while holding the second body 112 in single hand or both hands.

Figure 1D:
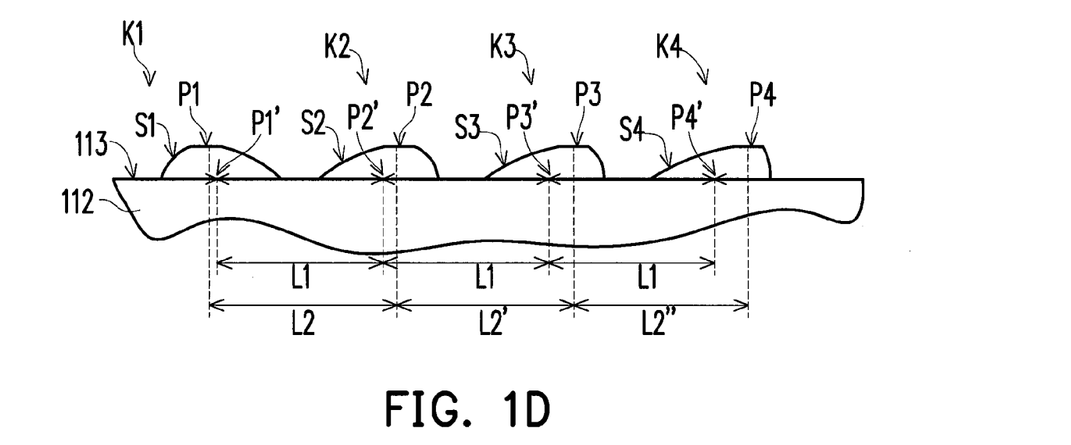
FIG. 1D is a local schematic diagram of the handheld electronic device of FIG. 1B.

FIG. 1D is a local schematic diagram of the handheld electronic device of FIG. 1B showing the keys of a B portion in FIG. 1B. Referring to FIGS. 1A-1D, only two adjacent keys K1 and K2 herein are exemplarily described. In the embodiment, the keys K1 and K2 respectively have a curved surface S1 and a curved surface S2 protruded from the base surface 113 and the curved surfaces S1 and S2 respectively have an inflection point P1 and an inflection point P2. It should be noted that a distance L2 between two inflection points P1 and P2 of the curved surfaces S1 and S2 of any two adjacent keys K1 and K2 is greater than a distance L1 between two figure centres P1' and P2' of the orthogonal projections on the base surface 112 of the curved surfaces S1 and S2 of the two adjacent keys K1 and K2.

Thereby, the curved surfaces S1 and S2 of the keys K1 and K2 in the embodiment are substantially and respectively an eccentric curved surface, i.e., the orthogonal projections on the base surface 113 of the inflection points P1 and P2 of the curved surfaces S1 and S2 are not superposed with the figure centres P1' and P2' of the orthogonal projections on the base surface 113 of the curved surfaces S1 and S2, which allows a user during pressing the keys K1 and K2 may distinguish each of the keys K1 and K2 by touch perception according to different eccentric extents of the curved surfaces S1 and S2 on the keys K1 and K2 so that the manipulation of inputting data may be conducted without gazing at. In other words, the density of the inflection points of the curved surfaces of the keys 122 is less than the density of the figure centres of the orthogonal projections on the base surface of the curved surfaces. Referring to FIGS. 1B and 1D, the keys 122 of the handheld electronic device 100 are arranged in a plurality of lateral rows H, in which for the keys 122 belonging to a same lateral row H, the density of the inflection points is less than the density of the figure centres of the orthogonal projections on the base surface of the curved surfaces. Taking the keys 122 belonging to a lateral row H shown by FIG. 1D as an example, since the figure centres P1'-P4' of the orthogonal projections on the base surface 113 of the curved surfaces S1-S4 of the keys K1-K4 are arranged in a same interval of a distance L1, and the distances L2, L2' and L2" between the orthogonal projections on the base surface 113 of any two adjacent inflection points of P1-P4 are respectively greater than the distance L1 between the two adjacent figure centres of P1'-P4' of the orthogonal projections of the corresponding curved surfaces, so that the density of the inflection points P1-P4 on the lateral row H is less than the density of the figure centres P1'-P4' of the orthogonal projections on the base surface 113 of the curved surfaces S1-S4. In this way, the keys 122 of the embodiment may be divided into a first group G1 adapted for a user to press with the left thumb and a second group G2 adapted for a user to press with the right thumb. For the keys 122 belonging to the first group G1, the inflection points of the curved surfaces thereof are deflected towards the direction of the left hand of the user. In contrary, for the keys 122 belonging to the second group G2, the inflection points of the curved surfaces thereof are deflected towards the direction of the right hand of the user.

The distance between any two adjacent inflection points herein is not limited. Referring to FIGS. 1B and 1D, among the keys 122 belonging to the first group G1, the distance between the inflection points of the curved surfaces for any two adjacent keys 122 near to the left hand of the user is greater than the distance between the inflection points for any two adjacent keys 122 far away from the left hand of the user. In contrary, among the keys 122 belonging to the second group G2, the distance between the inflection points of the curved surfaces for any two adjacent keys 122 near to the right hand of the user is greater than the distance between the inflection points for any two adjacent keys 122 far away from the right hand of the user. Thus, the eccentric directions of the curved surfaces of the keys 122 are respectively towards the left and right side edges 112a and 112b respectively held by the left and right hands of the user on the second sub body 112 (shown in FIG. 1A) so as to suit the user's holding habit.

Taking an example, the distance L2 between two inflection points P1 and P2 of the curved surfaces S1 and S2 for the keys K1 and K2 is substantially less than the distance L2' between two inflection points P2 and P3 of the curved surfaces S2 and S3 for the keys K3 and K4; and the distance L2' is less than the distance L2" between two inflection points P3 and P4 of the curved surfaces S3 and S4 for the keys K3 and K4. As a result, when the user holds the second sub body 112 in both hands, the inflection points of the curved surfaces of any two adjacent keys 122 are ascending respectively towards both hands of the user along with the lateral axis H; that is the inflection points of the curved surfaces of the keys 122 are substantially, gradually and respectively closer towards both hands of the user so that the user is easier to press the keys with the left and right thumbs thereof.

Figure 2:
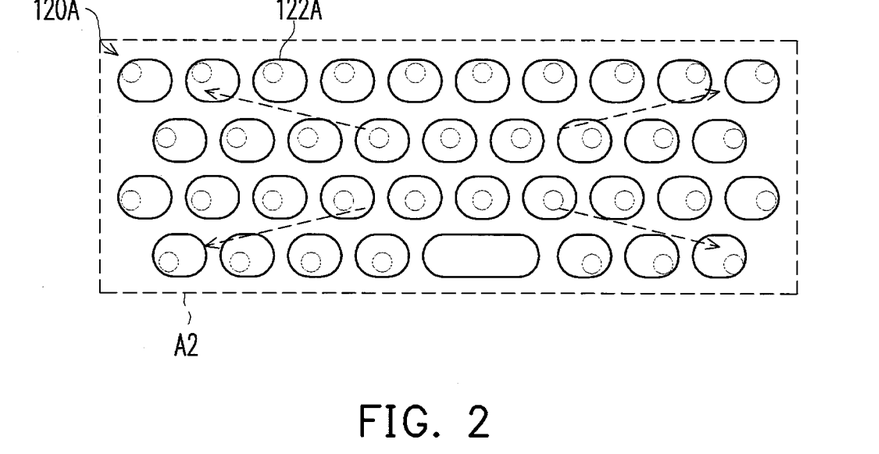
FIG. 2 is a schematic diagram of the key layout in a handheld electronic device according to another embodiment of the disclosure.
Figure 3:
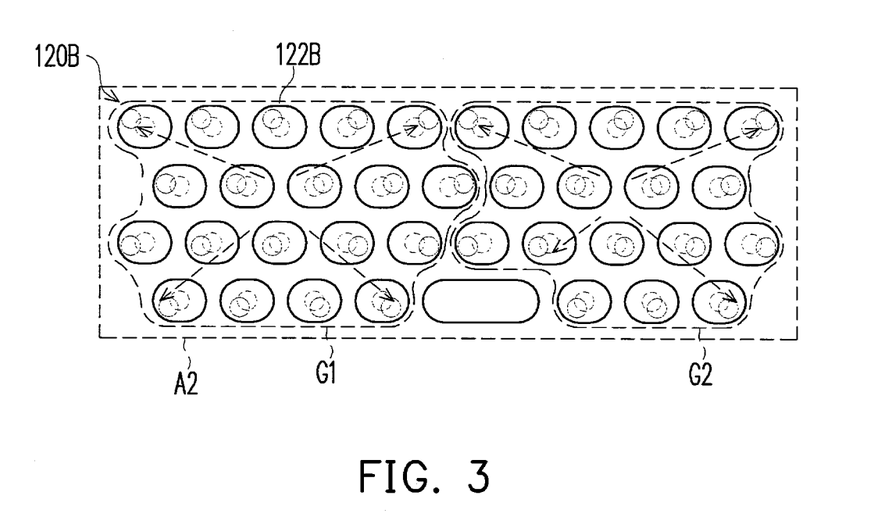
FIG. 3 is a schematic diagram of the key layout in a handheld electronic device according to yet another embodiment of the disclosure.

The above-mentioned eccentric direction of the curved surfaces is not limited to along the direction of the lateral row H, and a designer may design the curved surfaces of the keys to have different eccentric directions according to the application demand. FIG. 2 is a schematic diagram of the key layout in a handheld electronic device according to another embodiment of the disclosure. For the keys 122A of the key layout 120A in the embodiment, the distances between the inflection points of the curved surfaces are radially ascending from the figure centre of the key region A2 towards the directions far away from the figure centre (in FIG. 2, the deflection directions of the inflection points are indicated with dashed arrow lines). FIG. 3 is a schematic diagram of the key layout in a handheld electronic device according to yet another embodiment of the disclosure. Referring to FIG. 3, the keys 122b of a key layout 120B are divided into a first group G1 adapted for a user to press with the left thumb and a second group G2 adapted for a user to press with the right thumb. The distance between the inflection points of any two adjacent keys 122B in each of the groups G1 and G2 are radially ascending respectively from the centres of the groups G1 and G2 towards the directions far away from the centres (in FIG. 3, the deflection directions of the inflection points are indicated with dashed arrow lines). In this way, the designer may make appropriate modification design according to the usage habit of the user.

Figure 4A:
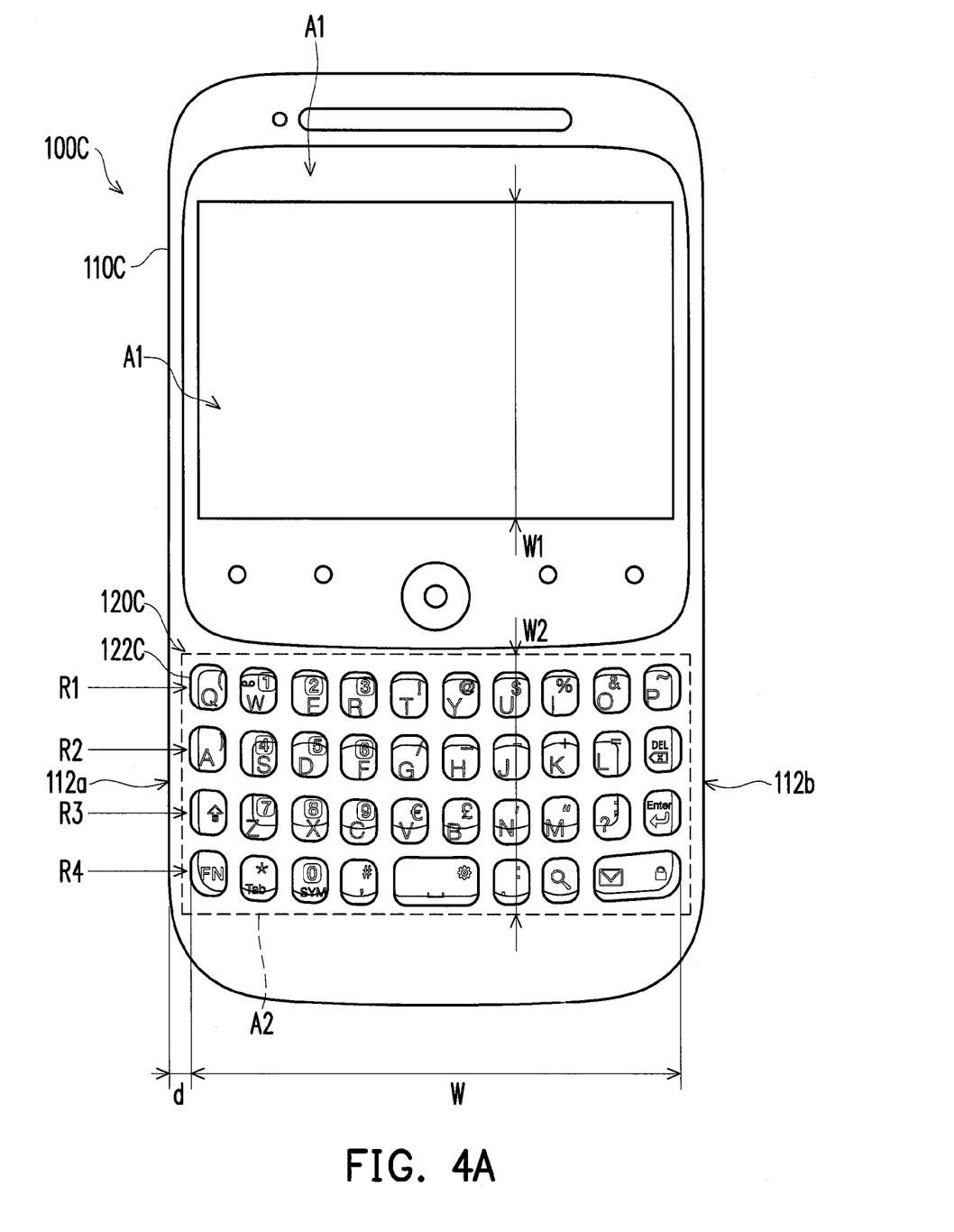
FIG. 4A is a schematic diagram of a handheld electronic device according to another embodiment of the disclosure.
Figure 4B:
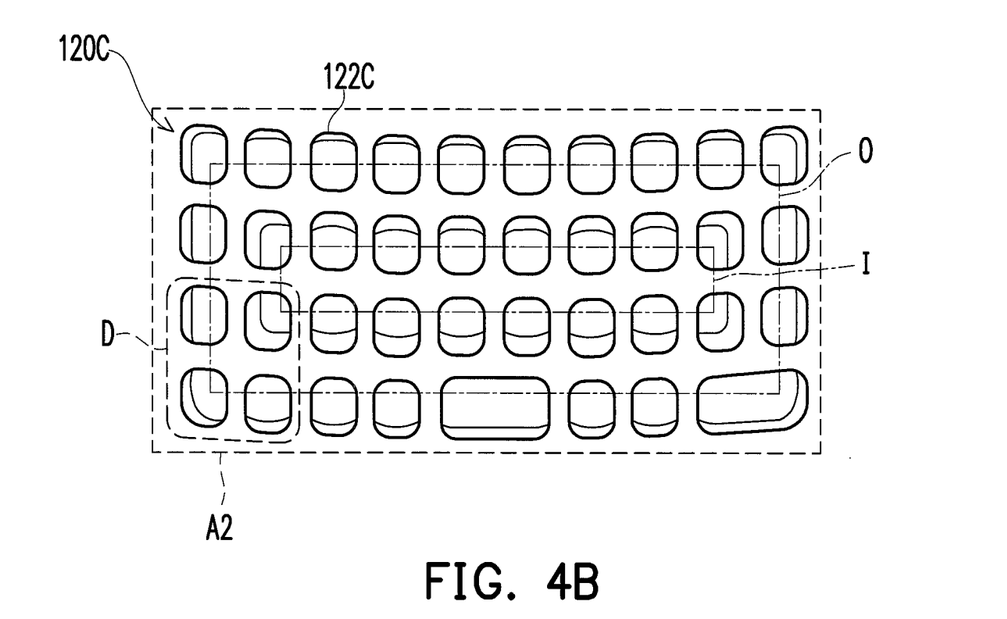
FIG. 4B is a schematic diagram of the key layout in the handheld electronic device of FIG. 4A.
Figure 4C:
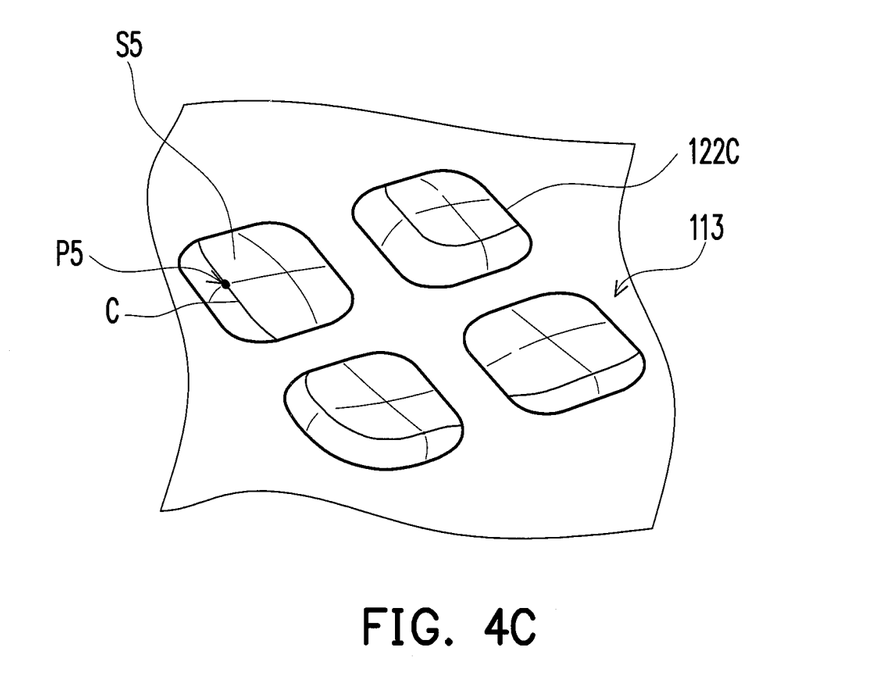
FIG. 4C is a schematic diagram of the keys of a portion D in the key layout of FIG. 4B.

FIG. 4A is a schematic diagram of a handheld electronic device according to another embodiment of the disclosure, FIG. 4B is a schematic diagram of the key layout in the handheld electronic device of FIG. 4A and FIG. 4C is a schematic diagram of the keys of a portion D in the key layout of FIG. 4B. Referring to FIGS. 4A-4C, the difference of the embodiment from the above-mentioned embodiments is that the handheld electronic device 100C is substantially a device in bar-type design. A body 110C thereof has a display region A1 and a key region A2 adjacent to one another, in which a key layout 120C is disposed on a base surface 113 in the key region A2. For the keys 122C of the handheld electronic device 100C, the distances between the inflection points of the curved surfaces of any adjacent keys 122C are radially ascending from the figure centre of the key region A2 towards the directions far away from the figure centre.

In more details, the curved surface S5 of each key 122C has a crest line C, and the crest line C passes through the inflection point P5 of the corresponding curved surface S5. In other words, the border between the two sub curved surfaces of each curved surface S5 forms a crest line C, and the highest point of the crest line C relative to the base surface 113 is the inflection point P5. Thus, the keys 122C are arranged in an inner loop I and an outer loop O, and the crest lines C of the keys 122C located at the inner loop I substantially form a profile line with an identical shape, and the crest lines C of the keys 122C located at the outer loop O substantially form a profile line with another identical shape.

Figure 5:
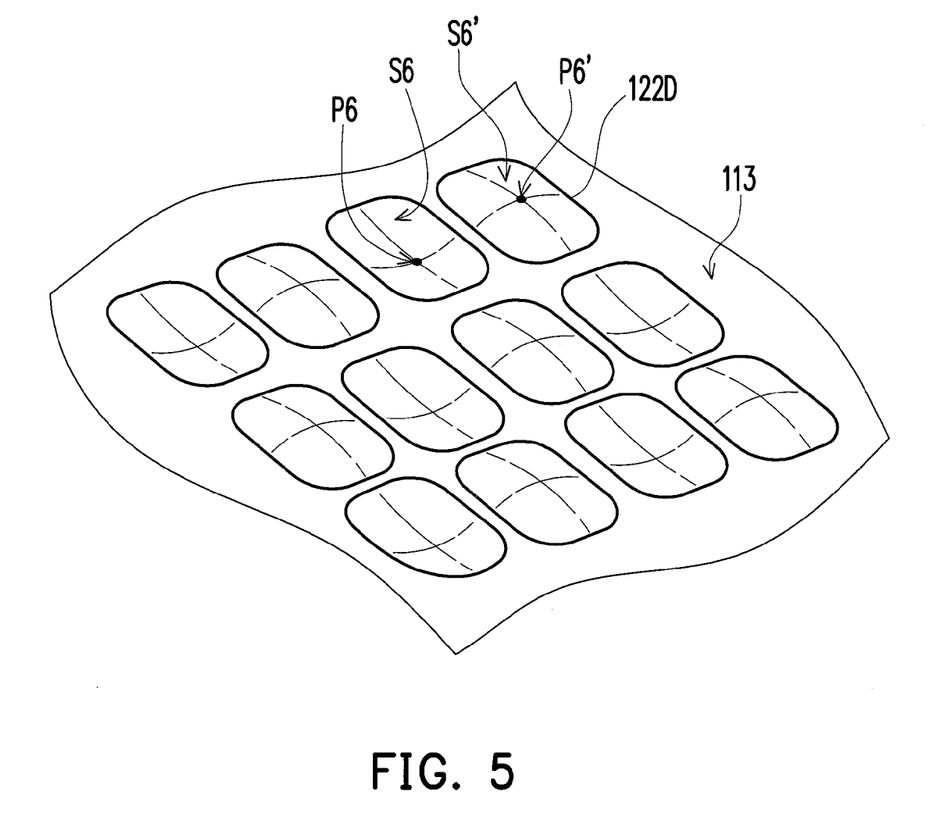
FIG. 5 is a local schematic diagram of a handheld electronic device at the keys thereof according to yet another embodiment of the disclosure.

FIG. 5 is a local schematic diagram of a handheld electronic device at the keys thereof according to yet another embodiment of the disclosure. Referring to FIG. 5, in the embodiment, the curved surfaces S6 and S6' of any two adjacent keys 122D are respectively a concave curved surface and a convex curved surface, and the inflection points P6 and P6' are respectively the relative highest point and the relative lowest point of the curved surfaces S6 and S6'. In this way, a user during pressing the keys 122D may distinguish different keys 122D by means of elevation or fall between the curved surfaces of the keys 122D, and a situation of wrongly touching a key may be avoided.

In the above-mentioned embodiments, an inflection point may be an area significantly discontinuous to the corresponding curved surface, for example, the truncation planes in FIG. 1B, 2 or 3. In addition, the inflection point may be a single point, for example, the highest point of the crest line in FIG. 4C and the highest point of the convex curved surface or the lowest point of the concave curved surface in FIG. 5.

Referring to FIG. 1A again, in the embodiment, the keys 122 may be arranged in four lateral rows R1-R4 in the key region A2. The leftmost key 122 of the lateral row R1 may be marked with 'Q' letter and the leftmost key 122 of the lateral row R2 may be marked with 'A' letter. A distance d1 between the leftmost key 122 and the left side edge 112a of the body 110 may range from 1 mm to 20 mm. The lateral width w of the lateral rows R1-R4 may range from 100 mm to 160 mm. The ratio of the longitudinal width w1 of the display region A1 on the body 110 over the longitudinal width w2 of the key region A2 on the body (i.e., the vertical width in FIG. 1A) may range from 1 to 2.

By means of the above-mentioned features, the key layout 120 of the handheld electronic device 100 may be integrated in miniature size on the key region A2 of the body 110, and the similar disposing design may be applied in the embodiment of FIG. 4A as well.

In summary, in the above-mentioned embodiments of the disclosure, the distance between two inflection points of the curved surfaces of any two adjacent keys is greater than the distance between two figure centres of the orthogonal projections on the base surface of the curved surfaces. In this way, different keys have different profile shapes on the base surface, so that a user during pressing the keys may identify by touch perception the position difference of each key to reduce the probability of wrongly touching a key and thereby increase the correctness rate of inputting data.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive.

What is claimed is:

1. A handheld electronic device, comprising:
a body, having a base surface; and
a key layout, disposed on the base surface of the body and comprising a plurality of keys, wherein the key layout is a QWERTY key layout,
wherein each key has a curved surface protruded from the base surface and each curved surface has an inflection point, the keys are divided into a first group and a second group,
wherein the inflection points of any two adjacent keys respectively belonging to the first group and the second group are close to each other, and a distance between the two inflection points of the curved surfaces of any two adjacent keys in each of the first group and the second group is greater than a distance between two figure centres of the orthogonal projections on the base surface of the curved surfaces of the two adjacent keys,
wherein the distance between the two inflection points of any two adjacent keys in the first group is radially ascending from a centre of the first group towards directions far away from the centre, and the distance between the two inflection points of any two adjacent keys in the first group is decreasing from a left side toward the centre of the first group, and then increasing from the centre toward a right side of the first group opposite to the left side,
wherein the distance between the two inflection points of any two adjacent keys in the second group is radially ascending from a centre of the second group towards directions far away from the centre, and the distance between the two inflection points of any two adjacent keys in the second group is decreasing from another left side toward the centre of the second group, and then increasing from the centre toward another right side of the second group opposite to the another left side.

2. The handheld electronic device as claimed in claim 1, wherein the body has at least a side edge, and the distance between the two inflection points of the curved surfaces of any two adjacent keys near to the side edge is greater than the distance between the two inflection points of the curved surfaces of any two adjacent keys far away from the side edge.

3. The handheld electronic device as claimed in claim 1, wherein the density of the inflection points of the curved surfaces is less than the density of the figure centres of the orthogonal projections on the base surface of the curved surfaces.

4. The handheld electronic device as claimed in claim 3, wherein the keys are arranged in a plurality of lateral rows, and among the keys located at a same lateral row, the density of the inflection points of the curved surfaces is less than the density of the figure centres of the orthogonal projections on the base surface of the curved surfaces.

5. The handheld electronic device as claimed in claim 3, wherein the density of the orthogonal projections on the base surface of the inflection points of the curved surfaces is less than the density of the figure centres of the orthogonal projections on the base surface of the curved surfaces.

6. The handheld electronic device as claimed in claim 1, wherein in the first group, the distance between the two inflection points of the curved surfaces of any two adjacent keys near to the left hand of a user is greater than the distance between the two inflection points of the curved surfaces of any two adjacent keys far away from the left hand of the user; in the second group, the distance between the two inflection points of the curved surfaces of any two adjacent keys near to the right hand of the user is greater than the distance between the two inflection points of the curved surfaces of any two adjacent keys far away from the right hand of the user.

7. The handheld electronic device as claimed in claim 1, wherein the keys respectively belonging to the first group and the second group are arranged in a plurality of lateral rows, and among the keys located at a same lateral row, the density of the inflection points of the curved surfaces is less than the density of the figure centres of the orthogonal projections on the base surface of the curved surfaces.

8. The handheld electronic device as claimed in claim 1, wherein among the keys respectively belonging to the first group and the second group, the density of the orthogonal projections on the base surface of the inflection points of the curved surfaces is less than the density of the figure centres of the orthogonal projections on the base surface of the curved surfaces.

9. The handheld electronic device as claimed in claim 1, wherein the body has a display region and a key region adjacent to the display region and the key layout is located at the key region.

10. The handheld electronic device as claimed in claim 9, wherein the distances between the inflection points of the curved surfaces of the any two adjacent keys are radially ascending from the figure centre of the key region towards the directions far away from the figure centre.

11. The handheld electronic device as claimed in claim 1, wherein the curved surfaces of the any two adjacent keys are respectively a convex curved surface and a concave curved surface, wherein the convex curved surfaces and the concave curved surfaces are interlaced with each other.

12. The handheld electronic device as claimed in claim 1, wherein the body comprises a first sub body and a second sub body, the first sub body is movably connected to the second sub body so as to be unfolded or closed to the second sub body, the first sub body has a display region, the second sub body has a key region, the key layout is located at the key region, and when the second sub body is unfolded to the first sub body, the key region is adjacent to the display region.

\* \* \* \* \*